United States Patent [19]

Jones

[11] Patent Number: 5,829,772
[45] Date of Patent: Nov. 3, 1998

[54] RIDE-ON, HUMAN-POWERED VEHICLE DRIVE AND STEERING MECHANISM

[75] Inventor: Micheal D. Jones, Portland, Oreg.

[73] Assignee: Columbia-Inland Corporation, Oregon City, Oreg.

[21] Appl. No.: 873,211

[22] Filed: Jun. 11, 1997

[51] Int. Cl.⁶ ..................................................... B62M 1/12
[52] U.S. Cl. .......................... 280/234; 280/233; 280/255
[58] Field of Search .................................... 280/233, 234, 280/244, 246, 255, 267, 288.2, 288.3; 188/19

[56] References Cited

U.S. PATENT DOCUMENTS

| | | |
|---|---|---|
| 25,550 | 9/1859 | Underhill . |
| 98,092 | 12/1869 | Neale . |
| 180,820 | 8/1876 | Appel et al. ............................. 188/19 |
| 375,755 | 1/1888 | Kidder . |
| 408,015 | 7/1889 | Kauffman ................................ 188/19 |
| 581,985 | 5/1897 | Fritz . |
| 609,498 | 8/1898 | Campbell . |
| 657,943 | 9/1900 | Kimball . |
| 926,131 | 6/1909 | McGowan . |
| 1,154,208 | 9/1915 | Rundle . |
| 1,219,287 | 3/1917 | Goben . |
| 1,368,066 | 2/1921 | Starr . |
| 1,439,465 | 12/1922 | Callaghan . |
| 1,455,124 | 5/1923 | Swinland . |
| 1,595,857 | 8/1926 | Coffman . |
| 1,604,888 | 10/1926 | Dews . |
| 1,620,926 | 3/1927 | Trullinger . |
| 2,114,648 | 4/1938 | Bevier . |
| 2,198,942 | 4/1940 | Leggitt . |
| 3,895,825 | 7/1975 | Sink . |
| 4,077,648 | 3/1978 | Seul . |
| 4,335,899 | 6/1982 | Hiscock .................................. 280/259 |
| 4,639,007 | 1/1987 | Lawrence ............................... 280/244 |
| 4,840,388 | 6/1989 | Doughty .................................. 188/19 |
| 4,861,055 | 8/1989 | Jones . |
| 4,925,200 | 5/1990 | Jones . |
| 5,280,936 | 1/1994 | Schmidlin ............................... 280/234 |

FOREIGN PATENT DOCUMENTS

| | | |
|---|---|---|
| 658935 | 6/1929 | France . |
| 75247 | 2/1954 | Netherlands . |
| 82992 | 3/1919 | Switzerland . |
| 1413844 | 11/1975 | United Kingdom . |
| 2458110 | 7/1976 | United Kingdom . |

*Primary Examiner*—Anne Marie Boehler
*Assistant Examiner*—Michael Cuff
*Attorney, Agent, or Firm*—Robert D. Varitz, P.C.

[57] ABSTRACT

A ride-on, human-powered vehicle a frame, which is integrally formed with the body of the vehicle. A front axle includes spaced-apart, steerable axle elements located on either side of the front end of the frame, each steerable axle element having a wheel rotatably mounted thereon A steering/power mechanism is mounted on the frame for oscillating motion relative to the frame that includes a steering shaft for steering the front wheels having a handle bar located at the upper end thereof. Foot rests are located at the lower end of the steering/power mechanism. A chain extends from the steering/power mechanism to the rear axle. A combination of the handle bar and the foot rests allow the rider to power the vehicle through the use of arms and legs simultaneously.

14 Claims, 4 Drawing Sheets

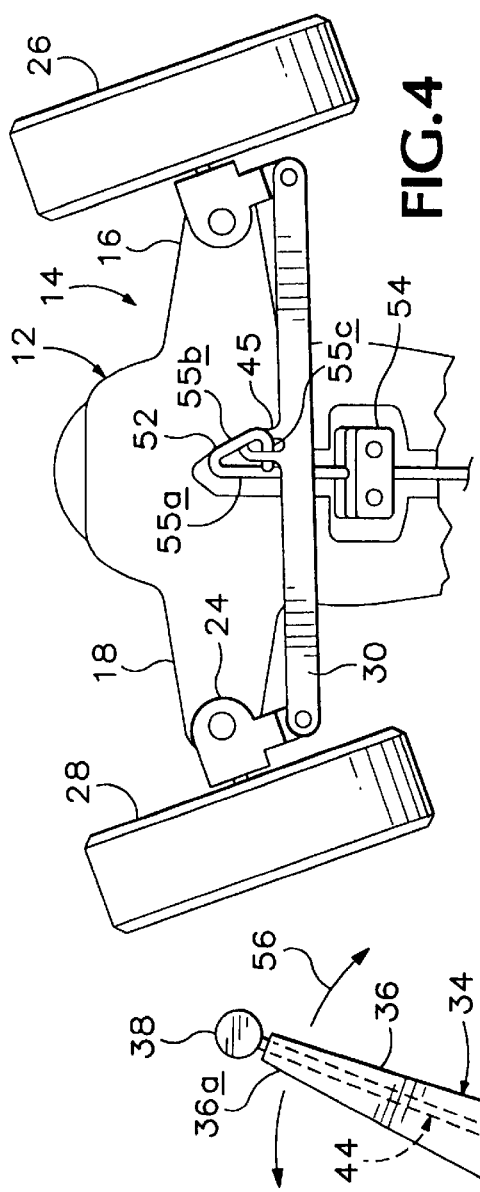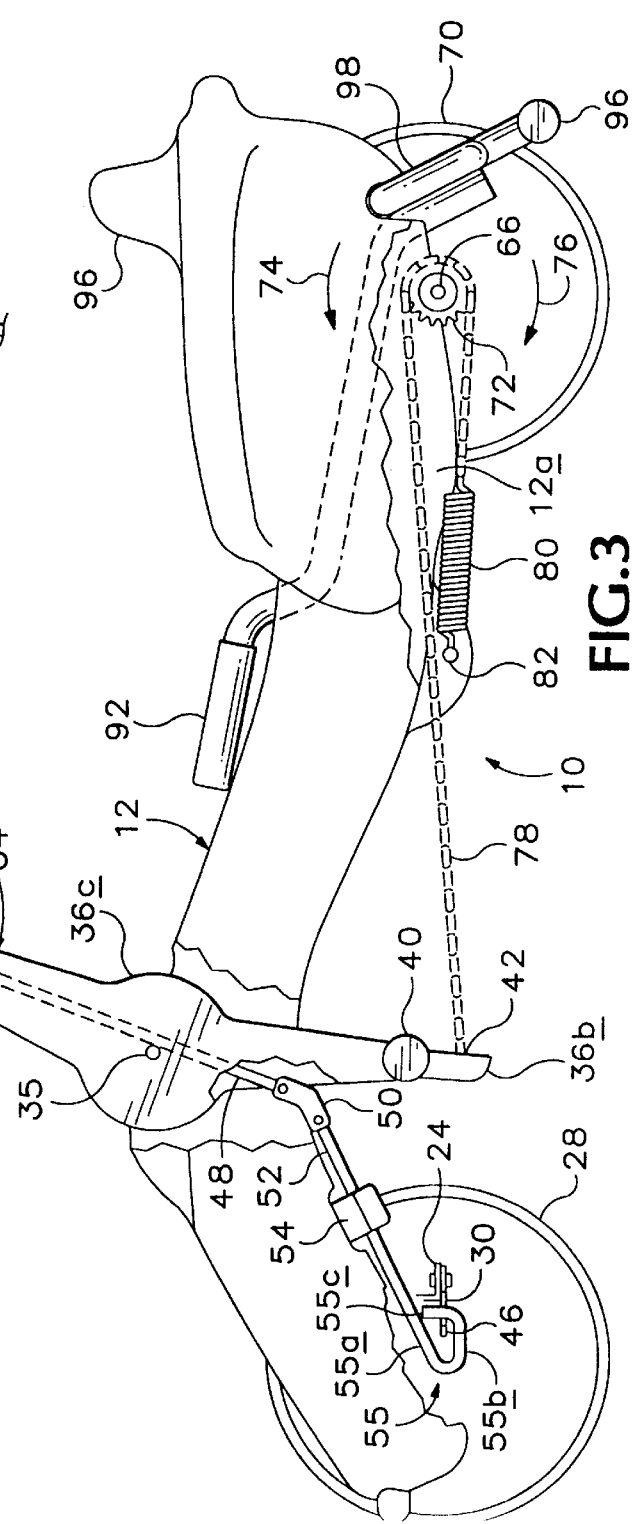

5,829,772

RIDE-ON, HUMAN-POWERED VEHICLE DRIVE AND STEERING MECHANISM

BACKGROUND OF THE INVENTION

This invention relates to a four-wheeled, ride-on, human-powered vehicle, and specifically to such a vehicle which includes a combined steering/drive mechanism.

There are many known drive mechanisms for human-powered vehicles. Known drive mechanisms are of the type which are found in a conventional bicycle, which transmits rotary motion from the front crank of a bicycle, powered by the rider's feet, to the driving wheel of the bicycle, which is generally the rear wheel. Various forms of gear mechanisms, such as the well-known nested gear with chain derailleur. Various forms of ratcheting gear drive mechanisms are known, such as those described in my earlier U.S. Pat. No. 4,861,055, granted Aug. 29, 1989, for DRIVE MECHANISM, and my U.S. Pat. No. 4,925,200, granted May 15, 1990, for a TRICYCLE DRIVE MECHANISM. Other drive mechanisms are known which go back into the mid-1800's.

As with my two earlier U.S. patents, it is a goal of the human-powered vehicle described herein to enable a rider to use both upper body and lower body muscles to power the vehicle, while simultaneously providing a vehicle having a low center of gravity and which is resistant to tipping over.

SUMMARY OF THE INVENTION

The ride-on, human-powered vehicle of the invention includes a frame, which is integrally formed with the body of the vehicle. The frame includes a front axle mount which receives a front axle. The front axle includes spaced-apart, steerable axle elements located on either side of the front end of the frame, each steerable axle element having a wheel rotatably mounted thereon, and a tie-rod extending between the steerable axle elements. The tie-rod includes a steering shaft receiver thereon. The frame includes a rear axle mount which receives a rear axle, which is driven and which includes a wheel attached on either end thereof. A steering/power mechanism is mounted on the frame for oscillating motion relative to the frame that includes a steering shaft for steering the front wheels having a handle bar located at the upper end thereof. Foot rests are located at the lower end of the steering/power mechanism. A chain extends from the steering/power mechanism to the rear axle. A combination of the handle bar and the foot rests allow the rider to power the vehicle through the use of arms and legs simultaneously.

It is an object of the invention to provide a ride-on, human-powered vehicle which allows the rider to utilize upper and lower body muscles.

Another object of the invention is to provide a ride-on vehicle which has a low center of gravity.

Yet another objection of the invention is to provide a ride-on vehicle which provides contour support for the rider's lower body.

These and other objects and advantages of the invention will become more fully apparent as the description which follows is read in conjunction with the drawings.

BRIEF DESCRIPTION OF THE DRAWINGS

FIG. 3 is an enlarged, side-elevation of the vehicle of the invention with portions of the frame thereof broken away to show detail of the steering/power mechanism.

FIG. 4 is a bottom plan view of the front end of the vehicle showing the front axle thereof.

DETAILED DESCRIPTION OF THE PREFERRED EMBODIMENT

Figure 1:
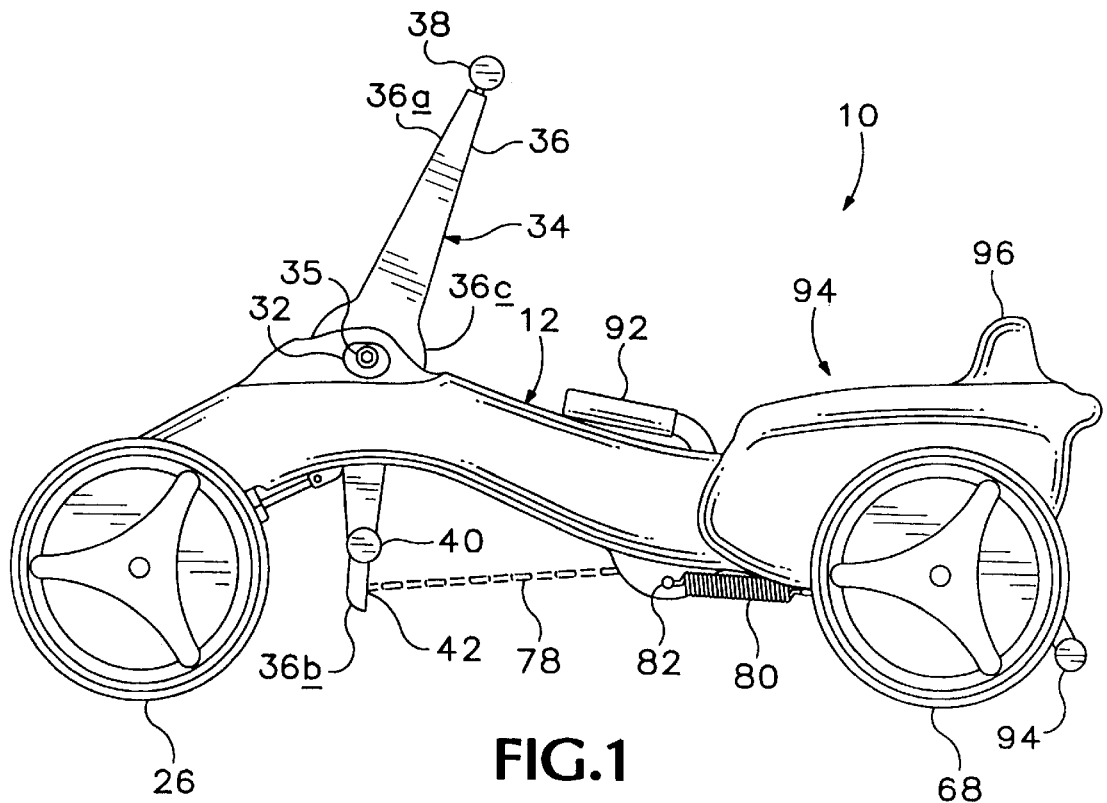
FIG. 1 is a side elevation of the ride-on vehicle of the invention.

Turning now to the drawings, and initially to FIG. 1, a ride-on, human-powered vehicle is depicted generally at 10. Vehicle 10 includes a frame 12 which includes an integrally formed body therewith, and, in the preferred embodiment, is formed as by injection or blow molding. Frame 12, also referred to herein as body/frame, includes a front axle mount 14 which includes a front-axle mount element 16 on the left side of the vehicle and a front-axle mount element 18 on the right side of the vehicle. A front axle, depicted generally at 20, includes a steering axle element 22 received on mount element 16 and another steering axle element 24 received on mount element 18. Steering-axle elements 22 and 24 are spaced-apart from one another and have wheels 26, 28 rotatably mounted thereon, respectively. A tie rod 30 extends between steering-axle elements 22, 24, joining the steering-axle elements and providing control there over.

Frame 12 includes a steering/power mechanism mount 32 thereon which receives a steering/power mechanism, depicted generally at 34, which is mounted for fore-and-aft oscillating motion relative to frame 12. Mechanism 34 is held in place in mount 32 by a nut-and-bolt combination 35, which allows the aforementioned oscillating motion. Mechanism 34 includes an elongate pumper unit 36 which has one end 36a extending above frame 12 and the other end 36b extending below the frame. Pumper unit 36 has a handle bar 38 mounted at the upper end 36a thereof, and foot rests 40 mounted at the other end 36b thereof. A portion of steering/power mechanism designated 36c forms a modified ball-and-socket mount with steering/power mechanism mount 32, such that there is, at no time during use of the mechanism, a gap greater than ⅛ inch between portion 36c and mount 32. This eliminates pinch points from the mechanism, and provides an exceptionally safe vehicle for the small users thereof.

A chain attachment point 42 is located adjacent foot rest 40. Pumper unit 36 may be formed by injection molding of two halves thereof, and subsequent assembly into the completed unit. Handle bar 38 may be rigid plastic or metal-core plastic, and the same construction may be used for foot rests 40.

Figure 2:
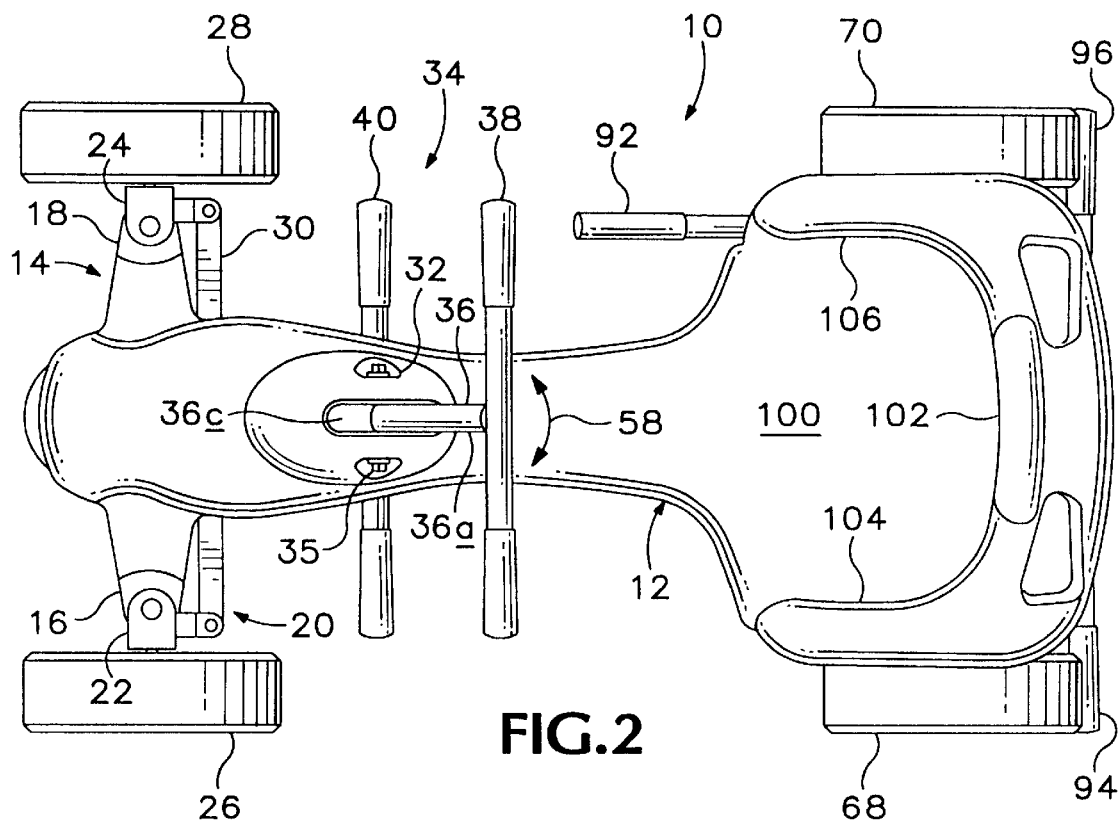
FIG. 2 is a top plan view of FIG. 1.

Referring now to FIGS. 1–3, steering/power mechanism 34 will be explained in greater detail. As seen in FIG. 3, pumper unit 36 has a steering shaft 44 extending longitudinally there through, connected to handle bar 38 at one end thereof and to a steering shaft receiver 46 in tie rod 30 at the other end thereof. In this embodiment of the invention, steering shaft 44 includes an upper portion 48, which is connected to handle bar 38 at one end thereof, and to a universal joint 50 at the other end thereof. A lower portion 52 of steering shaft 44 extends from universal joint 50 through a steering shaft mount 54, mounted on frame 12, and terminates at the connection of the steering shaft to steering shaft receiver 46 in tie rod 30. Lower portion 52 terminates in a steering shaft terminal element 55, which includes a first portion 55a, which is contiguous with the remainder of steering shaft 52, a return element 55b, which extends rearward and is substantially parallel to the ground, and an upright element 55c, which is substantially vertical, and which engages steering shaft receiver 46.

Universal joint 50 allows for the simultaneous oscillation of upper steering shaft 48 relative to lower steering shaft 52, as indicated by double headed arrow 56, while also allowing turning of handle bar 38, as indicated by double headed arrow 58, which steers front wheels 26, 28.

Figure 5:
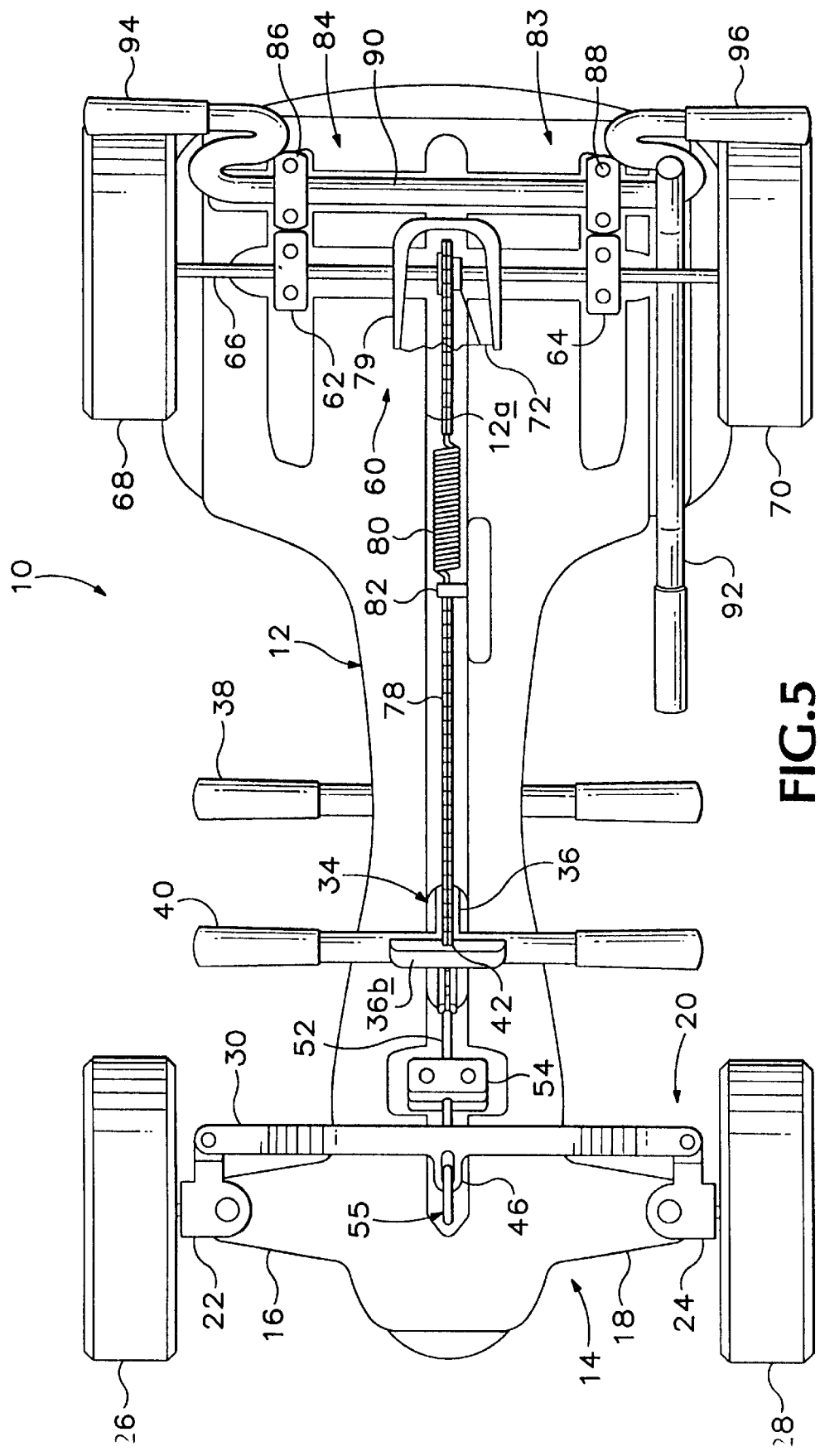
FIG. 5 is a bottom plan view of the vehicle.

Referring now to FIGS. 3 and 5, the remainder of the steering/power mechanism will be described. Frame 12 includes a rear axle mount 60 located adjacent to the rear of frame 12. Real axle mount 60 includes rear axle mount elements 62, 64 located on either side of frame 12. A single rear axle 66 extends through rear axle mount element 62, 64, and is rotatably mounted thereon. Rear wheels 68, 70 are fixed on axle 66 for rotation therewith.

A gear 72 is fixed to axle 66. In the preferred embodiment, gear 72 is a ratcheted gear and drives rear axle 66 when rotated in a first direction, represented by arrow 74, and coasts when rotated in a second direction, represented by arrow 76. Rotation of gear 72 is accomplished by means of a chain 78, which extends from chain attachment point 42 over the top of gear 72, the upper run of the chain, and terminates in a spring 80, the lower run of the chain, which in turn is attached to a spring attachment point 82 on frame 12.

It may now be seen that oscillation of pumper unit 36, and particularly by drawing handle bar 38 rearward and pushing foot rests 40 forward, will draw chain 78 forward, resulting in rotation of gear 72 in first direction 74 and extension of spring 80. When pressure is removed from handle bar 38 and foot rests 40, or when the handle bar is pushed forward and foot rests 40 allowed to move rearward, spring 70 will act on chain 78 to draw the upper run of chain 78 rearward, thereby rotating gear 72 in second direction 76. On the first described stroke, oscillating, fore-and-aft motion is converted to rotary motion and power is imparted to rear axle 66 and wheels 68, 70, causing vehicle 10 to move forward. Repeated oscillations of pumper unit 36 will result in continued movement of vehicle 10 forward.

Chain 78 is substantially enclosed by body/frame 12 in a chain cavity 12a, which extends partially along the length of body/frame 12 from the region of steering/power mechanism 34 to rear axle 66. A chain cover 79 (shown partially broken away in FIG. 5) encloses gear 72 and chain 78 below the level of rear axle 66. This construction provides a ride-on vehicle that has very little of its power mechanism exposed where portions of the mechanism could be reached by the young riders. Cover 79 is held in place by screws, or other suitable, removable fasteners.

In some versions of the vehicle, gear 72 may be replaced with a nested gear cluster and a suitable derailleur to provide a multi-speed vehicle.

As might be expected, some means is necessary to retard the forward movement of vehicle 10. To that end, a brake 83 is provided. Brake 83 includes a brake mount 84, located at the rear of frame 12, which brake mount includes brake bar mounting elements 86, 88. A brake bar 90 is received in mounting elements 86, 88, which brake bar extends across the rear of vehicle 10 and is configured to act upon rear wheels 68, 70 when engaged by means of a brake lever 92 which causes wheel contacting elements 94, 96 of brake bar 90 to engage rear wheels 68, 70, respectively, thereby retarding forward motion of the vehicle. Brake 83 may be equipped with some form of mechanisms to maintain its engagement with rear wheels 68, 70, however, in the embodiment depicted, the brake engages the rear wheels when brake handle 92 is raised upward and disengages the rear wheels when the handle is released, and allowed to drop to a lowered position by means of gravity. A stop 98 is provided to limit the downward movement of brake handle 92.

Returning now to FIGS. 1–3, frame 12 may be seen to include an integrally formed seat 100, having a contoured lower back rest 102, located at the rear thereof. The configuration of seat 100 and backrest 102 is such that the buttocks and lower back of the rider are fully supported, enabling the rider to exert a maximum force on foot rests 40 in order to propel vehicle 10. Additionally, seat 100 includes sides 104, 106, to provide lateral support for the rider, particularly when the vehicle is negotiating a turn. The seat, as configured, provides a cage for the rider's lower body to retain the rider's body on the vehicle.

As previously noted, it is an object of the invention to provide a vehicle which has a low center of gravity and which is extremely stable. To this end, the vehicle is provided with four wheels and is configured such that the rider's weight is distributed over and slightly forward of rear axle 66. It may be seen that in order for the vehicle to tip, extreme lateral forces have to be applied thereto.

Figure 6:
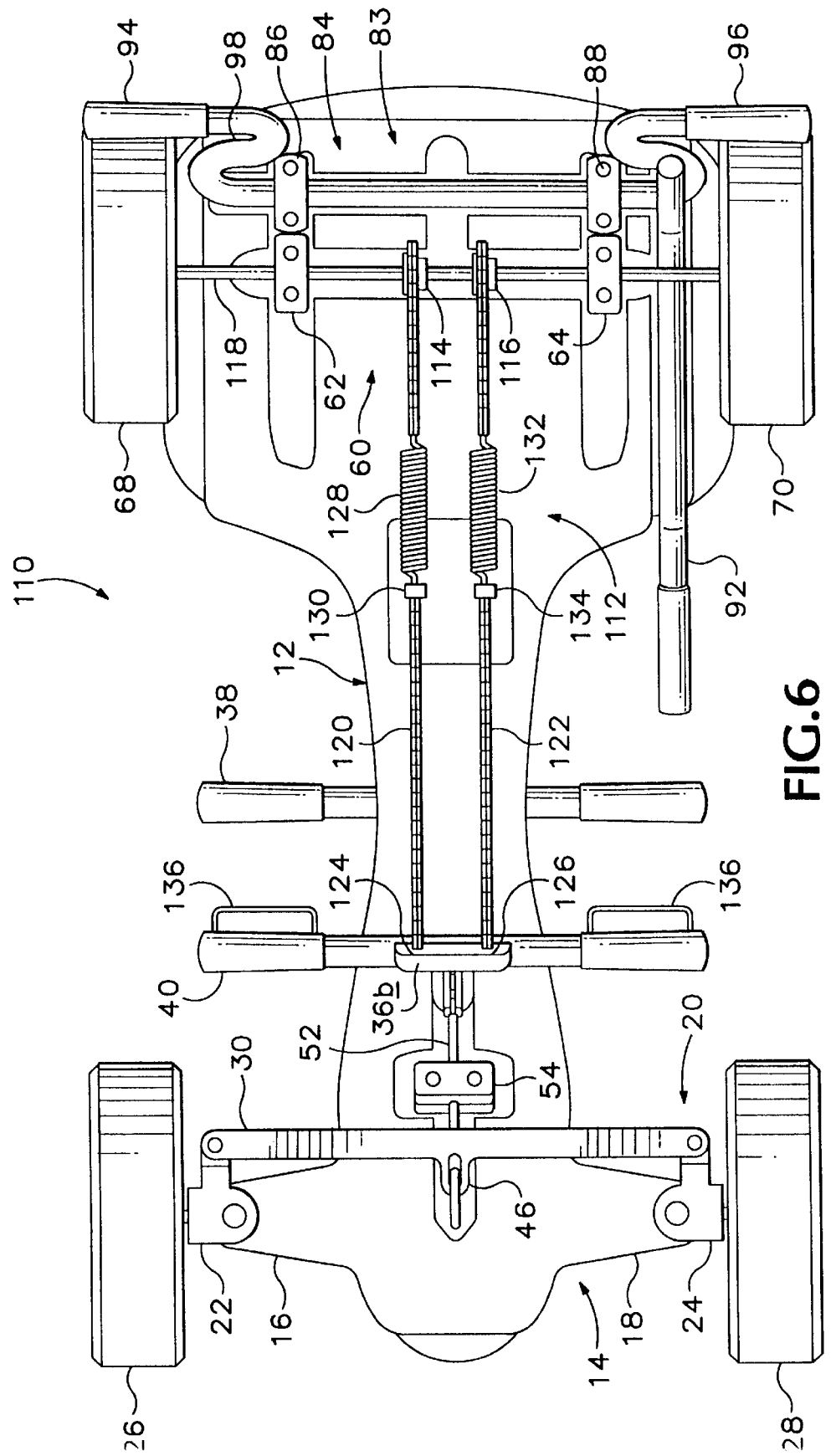
FIG. 6 is a bottom plan view of a second embodiment of the vehicle.

Referring now to FIG. 6, a second embodiment of the drive mechanism of the vehicle will be described. This vehicle, generally referred to by reference 110 is similar to vehicle 10 except for the dual drive mechanism, depicted generally at 112. Where structures are the same as those used with vehicle 10, like reference numerals are used. It is envisioned that vehicle 110 will be intended primarily for adult riders, whereas vehicle 10 may be more suitable for children.

Dual drive mechanism 112 includes a pair of ratcheted gears 114, 116 carried on an axle 118. Gears 114 and 116 are of the ratcheting type and are mounted such that, when gear 114 is rotated in a first direction, it provides a driving force to axle 118, while gear 116 coasts. When gear 116 is rotated in a second direction, it provides a driving force to axle 118, while gear 114 coasts. A pair of chains 120, 122 are provided and extend from chain attachment points 124, 126, respectively, on pumper unit 36. Chain 120 is trained over the top of gear 114 and then connected to a spring 128, which is in turned attached to a spring attachment point 130. Chain 122 is initially trained about the bottom of gear 116 and then to a spring 132, which is attached to a spring attachment point 134. This arrangement allows power to be provided to axle 118 when handle 38 is moved rearward, as well as when the handle bar is pushed forward. Likewise, foot rests 40 provide additional power from the rider's legs when pushed forward and, with the provision of toe straps 136, allow additional power to be provided when the legs are drawn rearward. As in the previously described embodiment, a chain cavity is provided within body/frame 112, and a chain cover is provided under the sprockets.

A variation of the dual drive mechanism described herein, is the elimination of springs 128, 132, and subsequent connection of the then free ends of chains 120, 122 about an idler wheel, which would eliminate the need to overcome the resistance of springs 128, 132.

Thus, a ride-on, human-powered vehicle has been disclosed, which has a very low center of gravity and high stability. Although a preferred embodiment of the invention has been disclosed, it should be appreciated that variations and modifications may be made thereto without departing from the scope of the invention, as defined in the appended claims.

I claim:

1. A ride-on, human-powered vehicle wherein the vehicle is powered by a rider, comprising:

a frame having a front axle mount, a rear axle mount and a steering/power mechanism mount thereon;

a front axle, received on said front axle mount, wherein said front axle includes spaced-apart, steerable axle elements, located on either side of said frame, each steerable axle element having a wheel rotatably mounted thereon, and a tie-rod extending between said steerable axle elements for steering the wheels mounted on said steerable axle elements, said tie rod having a steering shaft receiver thereon;

a rear axle, received on said rear axle mount, having a wheel fixed on either end thereof for rotation therewith;

a gear mounted on said rear axle for driving said rear axle;

a steering/power mechanism, received on said steering/power mechanism mount, for fore and aft oscillating motion relative to said frame about a pivot point, including an elongate pumper unit, which includes a steering shaft extending along said pumper unit, a universal joint located intermediate the ends thereof at a level below said pivot point, said steering shaft having a handle bar at one end thereof, adjacent one end of said pumper unit, and a connector at the other end thereof for joining said steering shaft to said steering shaft receiver, said pumper unit having a foot rest adjacent the other end thereof and a chain attachment point located adjacent to said footrest, and a chain extending from said chain attachment point and trained about said gear, and a spring attached to the free end of said chain and to said frame, for providing a return for said chain when said chain is pulled by said pumper unit, thereby rotating said gear;

wherein the rider provides a motive force to the vehicle by acting on said handle bar and on said foot rest, thereby oscillating said pumper unit and driving said rear axle.

2. The ride-on vehicle of claim 1 which includes a body, and wherein said frame and said body are integrally formed.

3. The ride-on vehicle of claim 2 wherein said frame and body include a chain cavity therein for substantially enclosing said chain, and which further includes a chain cover located below said gear.

4. The ride-on vehicle of claim 1 wherein said frame further includes a brake mount thereon, and wherein the vehicle includes a hand-operated brake that acts simultaneously on the rear wheels of the vehicle.

5. The ride-on vehicle of claim 1 wherein said gear is a racheted gear mounted on said rear axle for driving said rear axle when rotated in a first direction, and which coasts when rotated in a second direction.

6. The ride-on vehicle of claim 1 wherein said frame includes a seat for the rider, wherein said seat provides a cage for the rider's lower body, and which includes a contoured lower back support therein.

7. The ride-on vehicle of claim 1 wherein said steering/power mechanism mount and said steering/power mechanism are constructed and arranged to be pinch-free.

8. A ride-on, human-powered vehicle wherein the vehicle is powered by a rider, comprising:

an integrally formed body and frame having a front axle mount, a rear axle mount and a steering/power mechanism mount thereon;

a front axle, received on said front axle mount, wherein said front axle includes spaced-apart, steerable axle elements, located on either side of said frame, each steerable axle element having a wheel rotatably mounted thereon, and a tie-rod extending between said steerable axle elements for steering the wheels mounted on said steerable axle elements, said tie rod having a steering shaft receiver thereon;

a rear axle, received on said rear axle mount, having a wheel fixed on either end thereof for rotation therewith;

a single, racheted gear mounted on said rear axle for driving said rear axle when rotated in a first direction, and which coasts when rotated in a second direction;

a steering/power mechanism, received on said steering/power mechanism mount, for fore and aft oscillating motion relative to said frame about a pivot point, including an elongate pumper unit, which includes a steering shaft extending along said pumper unit, said steering shaft having a handle bar at one end thereof, adjacent one end of said pumper unit, a universal joint located intermediate the ends thereof at a level below said pivot point, and a connector at the other end thereof for joining said steering shaft to said steering shaft receiver, said pumper unit having a foot rest adjacent the other end thereof and a chain attachment point located adjacent to said footrest, wherein said steering/power mechanism mount and said steering/power mechanism include a modified ball-and-socket structure and are constructed and arranged to be pinch-free, and a chain extending from said chain attachment point and trained about said racheted gear, and a spring attached to the free end of said chain and to said frame, for providing a return for said chain when said chain is pulled by said pumper unit, thereby rotating said racheted gear in said first direction;

wherein the rider provides a motive force to the vehicle by acting on said handle bar and on said foot rest, thereby oscillating said pumper unit and driving said rear axle.

9. The ride-on vehicle of claim 8 wherein said frame and body include a chain cavity therein for substantially enclosing said chain, and which further includes a chain cover located below said gear.

10. The ride-on vehicle of claim 8 wherein said frame further includes a brake mount thereon, and wherein the vehicle includes a hand-operated brake that acts simultaneously on the rear wheels of the vehicle.

11. The ride-on vehicle of claim 8 wherein said frame includes a seat for the rider, wherein said seat provides a cage for the rider's lower body, and which includes a contoured lower back support therein.

12. A ride-on, human-powered vehicle wherein the vehicle is powered by a rider, comprising:

a frame having a front axle mount, a rear axle mount, a brake mount and a steering/power mechanism mount thereon, which further includes a body, and wherein said frame and said body are integrally formed, and wherein said frame and body include a chain cavity extending partially along the length thereof;

a front axle, received on said front axle mount, wherein said front axle includes spaced-apart, steerable axle elements, located on either side of said frame, each steerable axle element having a wheel rotatably mounted thereon, and a tie-rod extending between said steerable axle elements for steering the wheels mounted on said steerable axle elements, said tie rod having a steering shaft receiver thereon;

a rear axle, received on said rear axle mount, having a wheel fixed on either end thereof for rotation therewith;

a single, racheted gear mounted on said rear axle for driving said rear axle when rotated in a first direction, and which coasts when rotated in a second direction;

a steering/power mechanism, received on said steering/power mechanism mount, for fore and aft oscillating motion relative to said frame about a pivot point, including an elongate pumper unit, which includes a steering shaft extending along said pumper unit, said steering shaft having a handle bar at one end thereof, adjacent one end of said pumper unit, a universal joint located intermediate the ends thereof at a level below said pivot point, and a connector at the other end thereof for joining said steering shaft to said steering shaft receiver, said pumper unit having a foot rest adjacent the other end thereof and a chain attachment point located adjacent to said footrest, and a chain extending from said chain attachment point and trained about said racheted gear, and a spring attached to the free end of said chain and to said frame, for providing a return for said chain when said chain is pulled by said pumper unit, thereby rotating said racheted gear in said first direction, wherein said chain is substantially enclosed within said chain cavity;

a chain cover located below said gear for enclosing a portion of said chain and said gear; and a hand-operated brake that simultaneously contacts and applies a braking force to the rear wheels of the vehicle;

wherein the rider provides a motive force to the vehicle by acting on said handle bar and on said foot rest, thereby oscillating said pumper unit and driving said rear axle.

13. The ride-on vehicle of claim 12 wherein said frame includes a seat for the rider, wherein said seat provides a cage for the rider's lower body, and which includes a contoured lower back support therein.

14. The ride-on vehicle of claim 12 wherein said steering/power mechanism mount and said steering/power mechanism are constructed and arranged to be pinch-free.

* * * * *